(12) United States Patent
De Vis et al.

(10) Patent No.: US 9,407,077 B2
(45) Date of Patent: Aug. 2, 2016

(54) SUPPORT FRAME FOR STRUCTURED CABLING SYSTEM

(71) Applicants: CommScope Connectivity Belgium BVBA, Kessel-Lo (BE); COMMSCOPE ASIA HOLDINGS B.V., 'S-Hertogenbosch (NL)

(72) Inventors: Willem De Vis, Merchtem (BE); Heidi Bleus, Genk (BE); Jan Zeeman, HH Huizen (NL)

(73) Assignee: Commscope Asia Holdings B.V., 'S-Hertogenbosch, 'S-Hertogenbo (NL)

( * ) Notice: Subject to any disclaimer, the term of this patent is extended or adjusted under 35 U.S.C. 154(b) by 0 days.

(21) Appl. No.: 14/298,013

(22) Filed: Jun. 6, 2014

(65) Prior Publication Data

US 2014/0360751 A1   Dec. 11, 2014

Related U.S. Application Data

(60) Provisional application No. 61/832,480, filed on Jun. 7, 2013, provisional application No. 61/836,520, filed on Jun. 18, 2013.

(51) Int. Cl.
*H02G 3/22* (2006.01)
*H02G 3/10* (2006.01)

(52) U.S. Cl.
CPC . *H02G 3/22* (2013.01); *H02G 3/105* (2013.01)

(58) Field of Classification Search
CPC ................................. H02G 3/22; H02G 3/105
USPC ............................................... 174/71 A, 68.3
See application file for complete search history.

(56) References Cited

U.S. PATENT DOCUMENTS 6,664,467 B1 * 12/2003 de la Borbolla .............. 174/503

FOREIGN PATENT DOCUMENTS

| DE | 20 2007 017 167 U1 | 5/2009 |
| DE | 20 2011 005 478 U1 | 8/2011 |
| EP | 1 775 813 A2 | 4/2007 |
| GB | 2 421 122 A | 6/2006 |

OTHER PUBLICATIONS

International Search Report and Written Opinion for PCT/EP2014/061852 mailed Sep. 26, 2014.

* cited by examiner

*Primary Examiner* — Dhirubhai R Patel
(74) *Attorney, Agent, or Firm* — Merchant & Gould P.C.

(57) ABSTRACT

A support frame (10) for a cabling trunk assembly (1) is disclosed. In one embodiment, the support frame (10) has a main body (11) defining a mounting surface (41), and a first extension leg (50) extending along a first side edge (42) of the main body (11) and away from the mounting surface (41). Similarly, the support frame (10) can be provided with a second extension leg (52) that extends along a second side edge (44) of the main body (11) and away from the mounting surface (41). The extension legs (50, 52) may be provided with tabs (54, 56) to provide a secure connection with receiving grooves (28, 29) on a channel (12) of the cabling trunk assembly (1). The extension legs (50, 52) may also be configured to provide a snap-fit connection with the receiving grooves (28, 29).

7 Claims, 8 Drawing Sheets

SUPPORT FRAME FOR STRUCTURED CABLING SYSTEM

CROSS REFERENCE TO RELATED APPLICATIONS

This application claims the benefit of U.S. Provisional Application No. 61/832,480, filed Jun. 7, 2013, entitled "Support Frame for Structured Cabling System," and U.S. Provisional Application No. 61/836,520, filed Jun. 18, 2013, entitled "Support Frame for Structured Cabling System." The disclosures of U.S. 61/836,520 and U.S. 61/832,480 are hereby incorporated herein by reference in their entirety.

BACKGROUND

Structured cabling installations, such as those commonly utilized in work area portions of office network environments, can include cabling trunk assemblies to which connector housings are attached. Such configurations allow for cabling within the trunk assemblies to be routed to various connectors in the housings. For example, a connector housing may have a co-axial jack, a data jack, and/or a telephone jack wherein the associated cabling is housed within the trunk assembly. Commonly, trunk assemblies are provided in the form of a c-shaped channel wherein a removable cover is placed over the open face of the channel. Installers frequently field cut openings in the removable cover in order allow for access between the channel and the connector housing. Also, some known solutions provide a support frame that is connected to the back of the channel which can interfere with the internal routing of the cabling within the channel. Improvements are desired.

SUMMARY

A support frame for a cabling trunk assembly is disclosed. In one aspect, the support frame connects to the cabling trunk assembly and provides a mounting surface for a face plate and a connector housing such that cabling within the trunk assembly may be connected to the connector housing. In one aspect, the cabling trunk assembly includes a body defining a c-shaped channel having a first open face wherein a first receiving groove extends along a first side of the open face and a second receiving groove extends along a second side of the open face. In one aspect, the support frame has a main body defining a mounting surface extending between opposite first and second side edges and extending between opposite third and fourth side edges. The mounting surface may include a central aperture for allowing cabling to be routed from the channel to the connector housing.

In one embodiment, the support frame includes a first extension leg extending along the main body first side edge and extending away from the mounting surface wherein the first extension leg is configured for insertion into the first receiving groove. Similarly, a second extension leg parallel to the first extension leg and extending along the main body second side edge and away from the mounting surface may be provided wherein the first extension leg is configured for insertion into the second receiving groove. The first extension leg may be provided with a first tab configured to provide a secure connection with the first receiving groove. Likewise, the second extension leg may be provided with a second tab configured to provide a secure connection with the second receiving groove. In one embodiment, the first extension leg and the first receiving groove are configured to engage with each other in a snap-fit connection and the second extension leg and the second receiving groove are configured to engage with each other in a snap-fit connection.

The support frame may be provided with at least one threaded opening, for example two threaded openings, in the mounting surface for securing the face plate to the support frame. Also, the face plate may be provided with at least one threaded opening, for example two threaded openings, for securing a connector housing to the face plate. In one embodiment, the threaded openings in the face plate are offset from the threaded openings in the support frame to prevent interference between fasteners associated with the threaded openings.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

DETAILED DESCRIPTION

Figure 1:
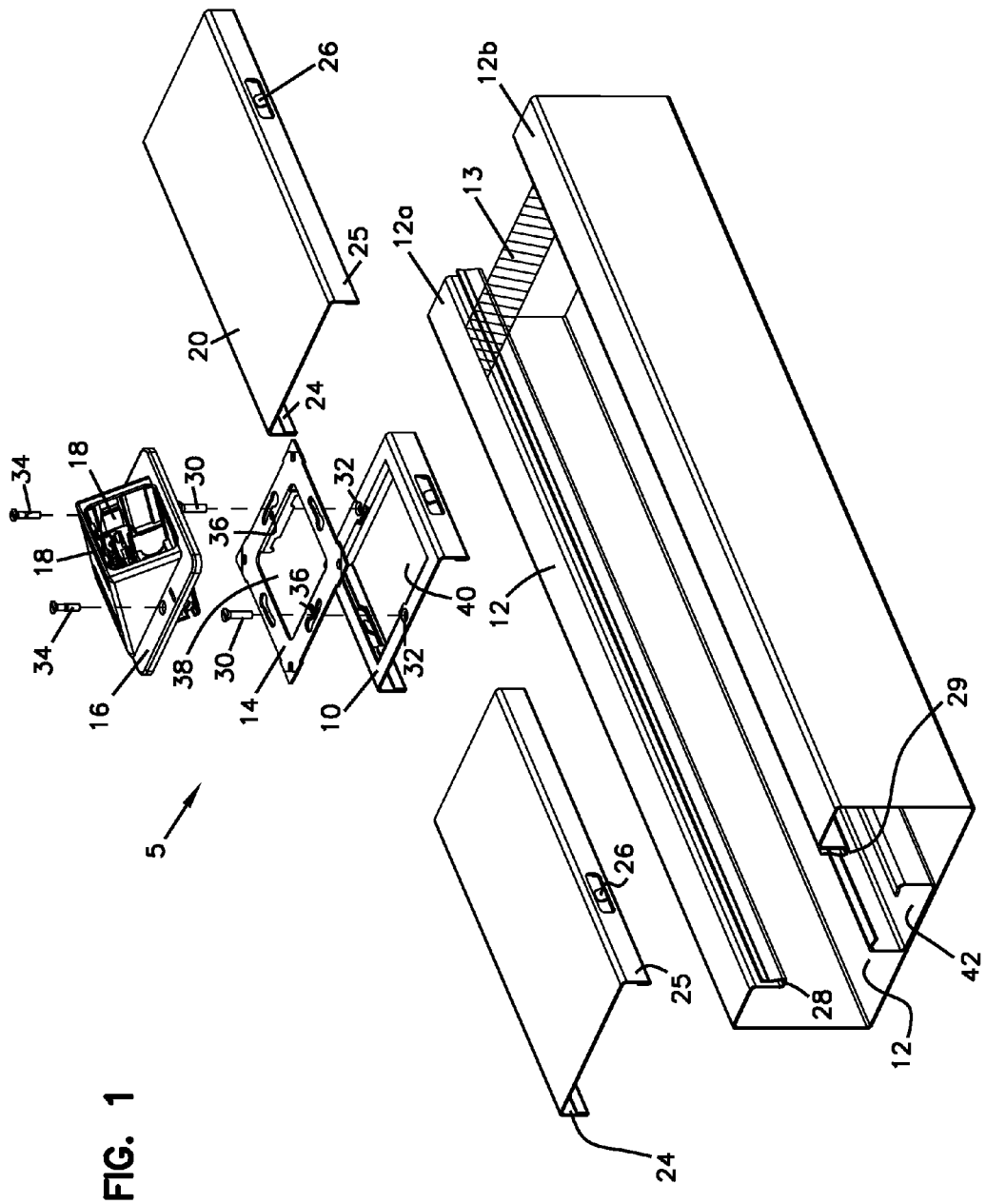
FIG. 1 is a an exploded perspective view of a support frame system attached to a trunking system channel body having features that are examples of aspects in accordance with the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 2:
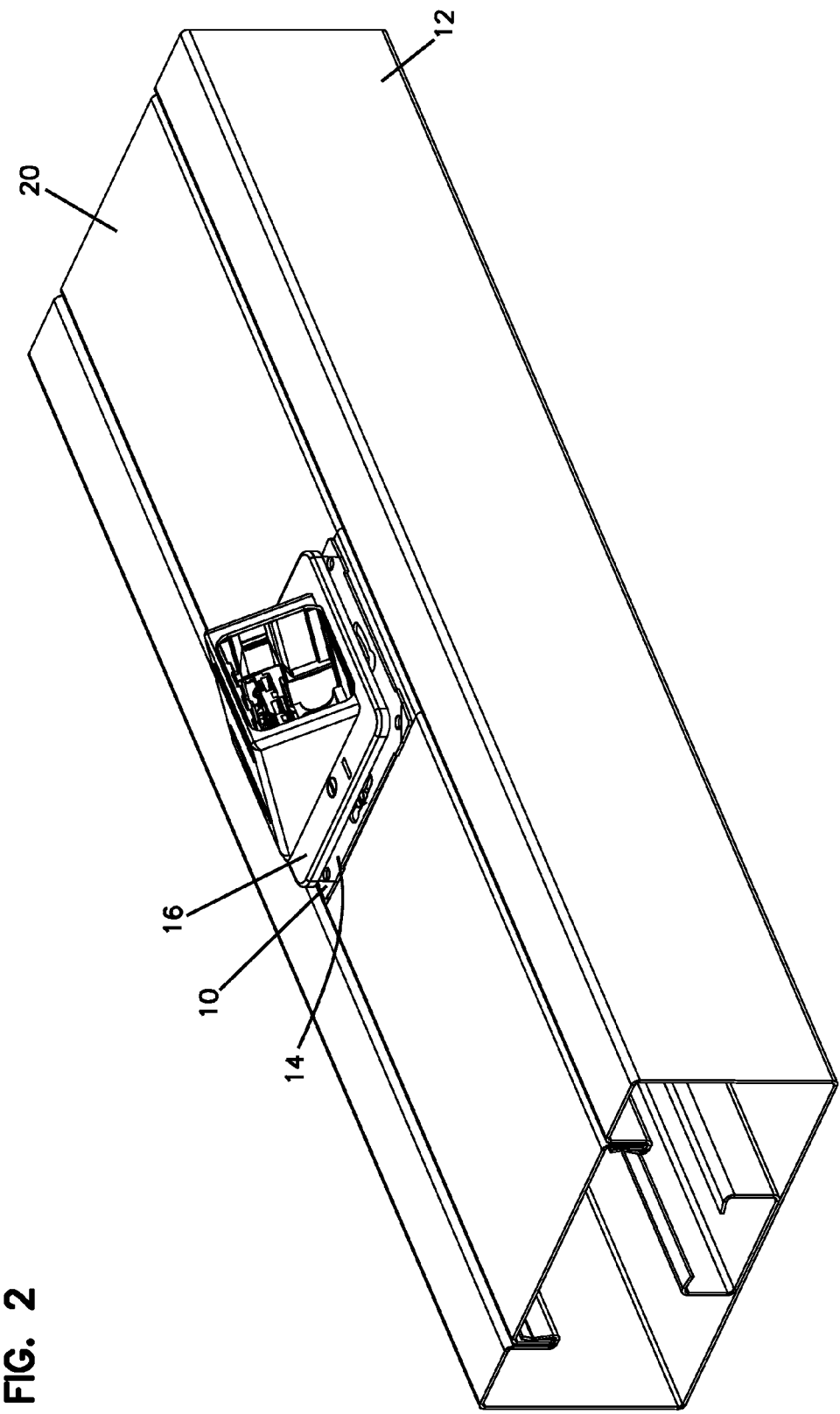
FIG. 2 is a perspective view of the assembled trunking system and support frame system shown in FIG. 1.
Figure 3:
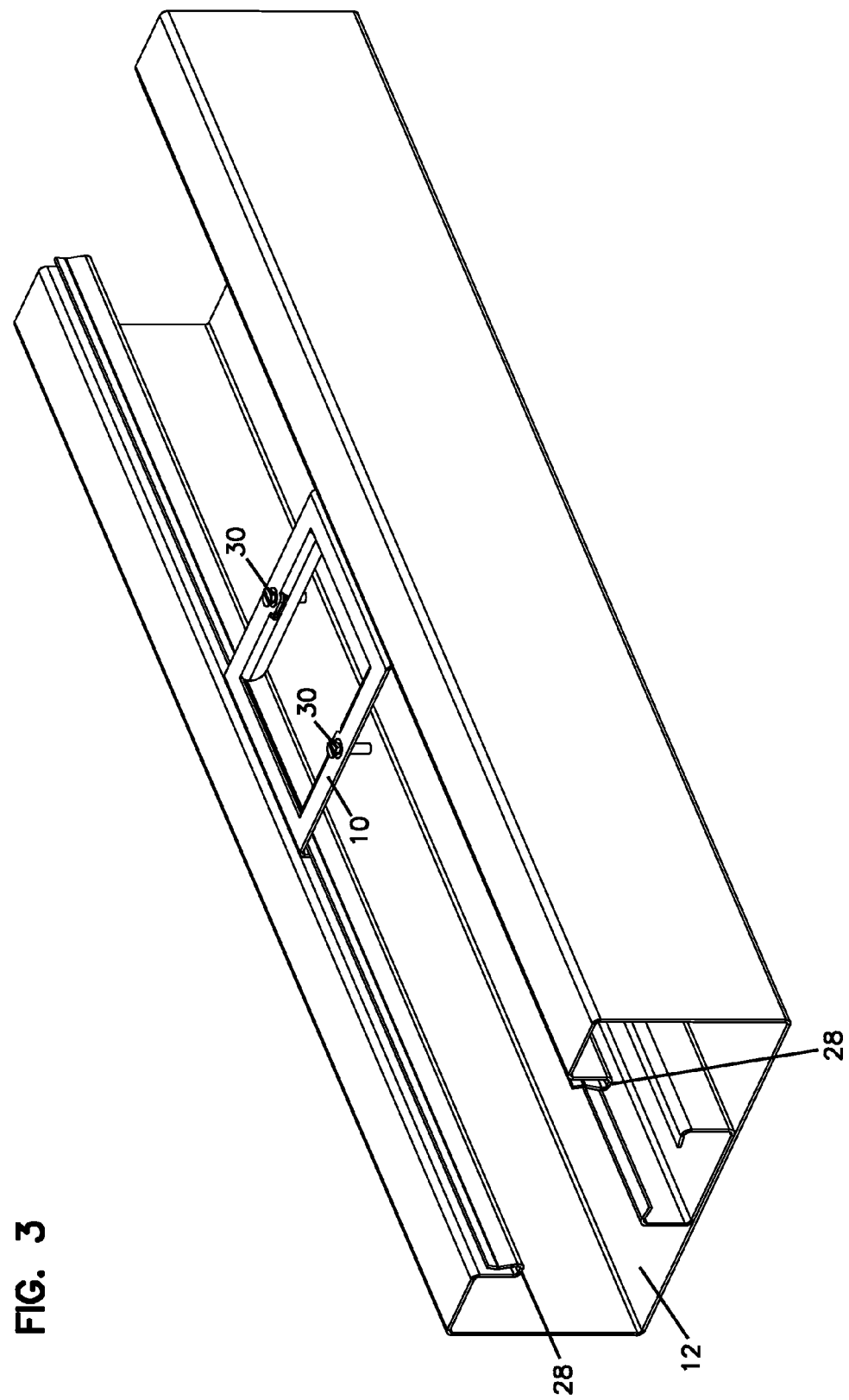
FIG. 3 is a perspective view of a support frame of the support frame system connected to the channel body shown in FIG. 1.

Referring to FIGS. 1 and 2, a support frame system 5 including a support frame 10 for attachment to the channel body 12 of a trunking system 1 is shown. In general, the channel body 12 is configured as a c-shaped channel and functions to protect and conceal cabling routed within the channel body 12. Non-exclusive examples of cabling are co-axial cabling, copper based cabling, fiber optic cabling, and electrical power cabling. As configured, the support frame 10 provides a support surface for a face plate 14 which in turn supports a connector housing 16. The connector housing 16 can be configured to include receptacles or jacks 18 for receiving connectors, such as fiber optic adapters and copper based plugs data used in data and telecommunications applications. Non-limiting examples of suitable receptacles are RJ type jacks (e.g. RJ-11, RJ-45, etc.), co-axial cable jacks (e.g. CATV jacks), fiber optic connectors (e.g. LC, SC, MTP, etc.), D type connectors (e.g. DE-15, DA-15, etc.), and other types of connectors that may be used for communication or power transmission purposes. To facilitate the passage of cables from the channel body 12 into the housing 16, the face plate 14 and support frame 10 are each shown as having a central aperture 38, 40, respectively.

In one aspect, the face plate 14 is attached to the support frame 10 via fasteners 30 while the housing 16 is attached to the face plate 14 via fasteners 34. As shown, fasteners 30 are threaded screws that are received and secured into threaded openings 32 located on the support frame 10. Similarly, fasteners 34 are threaded screws that are received and secured into threaded openings 36 located on the face plate 14. Other types of fasteners may also be used without departing from the concepts presented herein. In one aspect, the location of the threaded openings 32, 36 are offset to prevent interference between the fasteners 30, 34. It is noted that connector housing 16 may also be directly attached to the support housing 10 without the use of a face plate 14, if desired.

The trunking system may also be provided with removable covers 20, 22 located adjacent the support frame 10 for covering the open face 13 of the channel body 12 such that the interior of the channel body 12 can be concealed. In one aspect, the removable covers 20, 22 can be generally flush with or slightly recessed from side portions 12a, 12b of the channel body 12. In one embodiment, the covers 20, 22 can be provided with extension legs 24, 25 having tabs 26 to facilitate a secure snap-fit connection with an indented portion 28a, 29a of corresponding grooves 28, 29 in the channel body 12.

As most easily seen at FIGS. 4-9, the support frame 10 includes a main body 11 defining a mounting surface 41. Mounting surface 41 is for supporting a face plate 14 which may be adapted for a particular connector housing 16. The mounting surface 41 can also be provided to directly support a connector housing 16 or other types of terminal devices, such as one or more electrical duplex sockets. As discussed previously, the mounting surface 41 can have a central aperture 40 to allow for cabling to extend through the main body 11. The central aperture 40 also allows for portions of the connector housing 16 and/or faceplate 14 to extend through the support frame main body 11 and into the channel body 12.

In one aspect, the mounting surface 41 extends between a first side edge 42 and a second side edge 44 opposite first side edge 42 such that the side edges 42, 44 are parallel to each other. In another aspect, the mounting surface 41 extends between a third side edge 46 and a fourth side edge 48 opposite third side edge 46 such that the third and fourth side edges 46, 48 are parallel to each other.

As shown, a first extension leg 50 is provided on the support frame main body 11 along the first side edge 42 of the mounting surface 41. As configured, the first side edge 42 extends in a direction that is orthogonally away from the mounting surface 41. Similarly, a second extension leg 52 is provided that extends along the second side edge 44 and also extends in a direction that is orthogonally away from the mounting surface 41. The first and second extension legs 50, 52 are configured to be received in the receiving grooves 28, 29 of the channel 12 such that the support frame 10 can be directly mounted to the channel 12 without any portion of the support frame 10 extending into the interior volume 15 of the channel 12.

Figure 4:
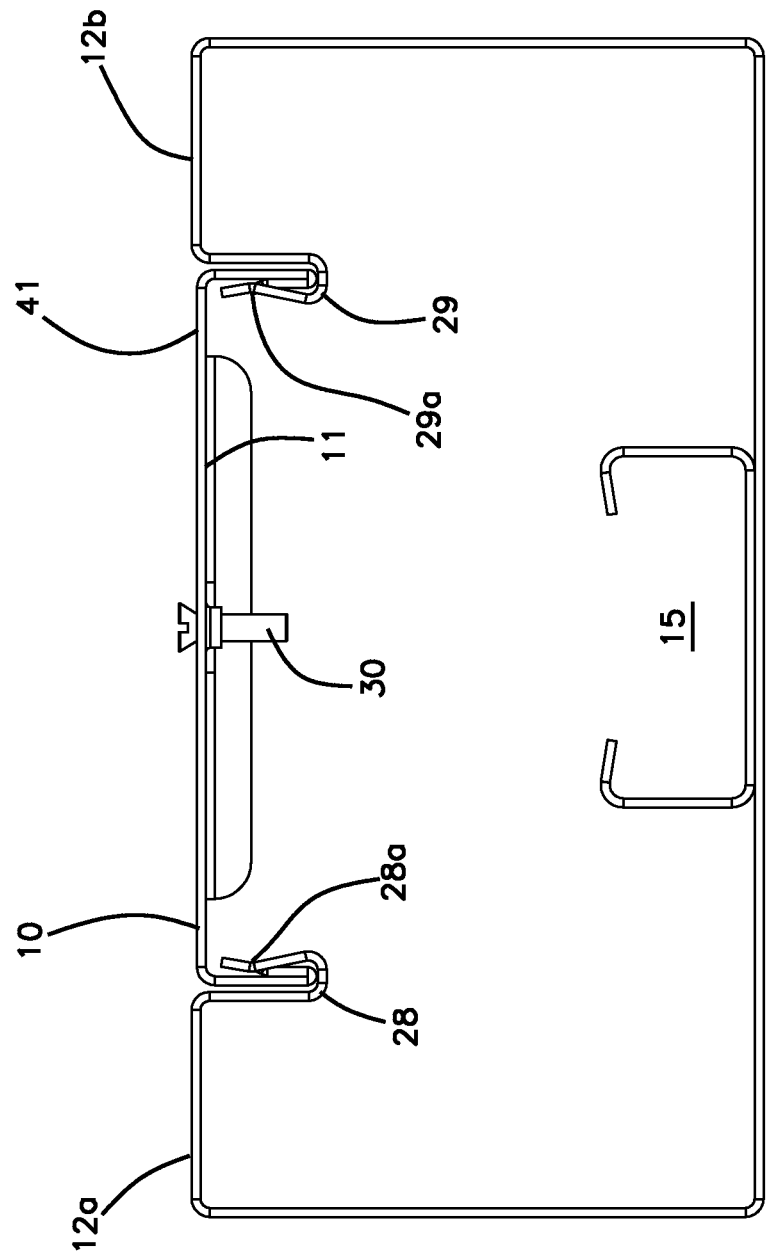
FIG. 4 is an end view of the support frame and channel body shown in FIG. 3.
Figure 5:
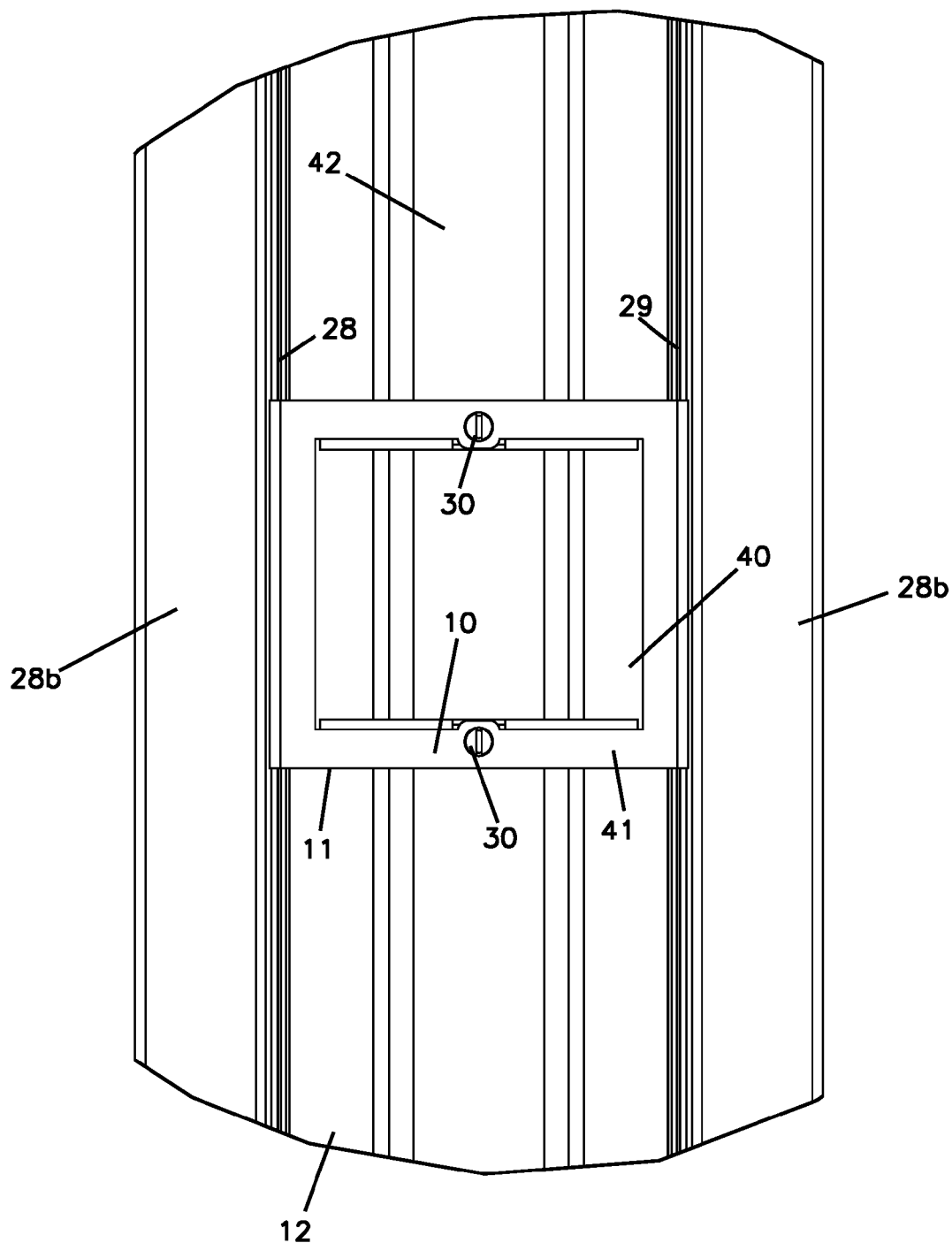
FIG. 5 is a top view of the support frame and channel body shown in FIG. 3.
Figure 6:
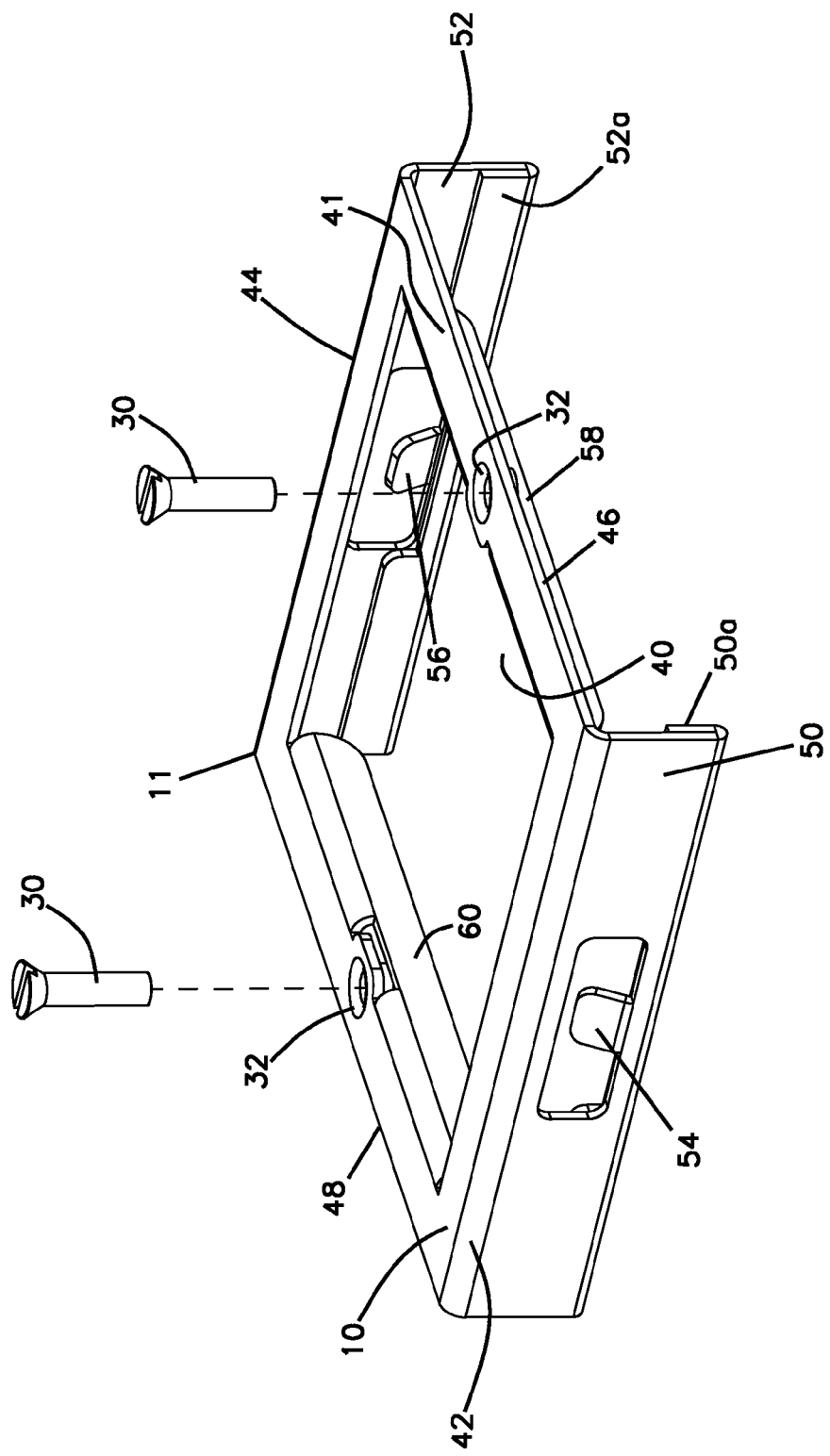
FIG. 6 is a perspective view of the support frame shown in FIG. 1.
Figure 7:
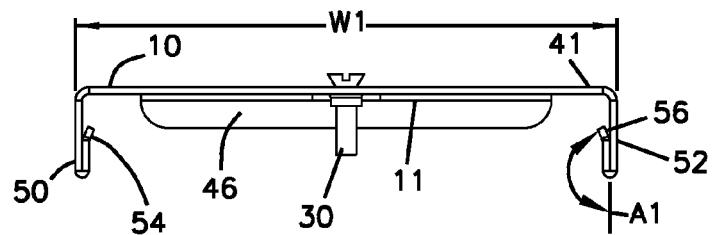
FIG. 7 is an end view of the support frame shown in FIG. 1.
Figure 8:
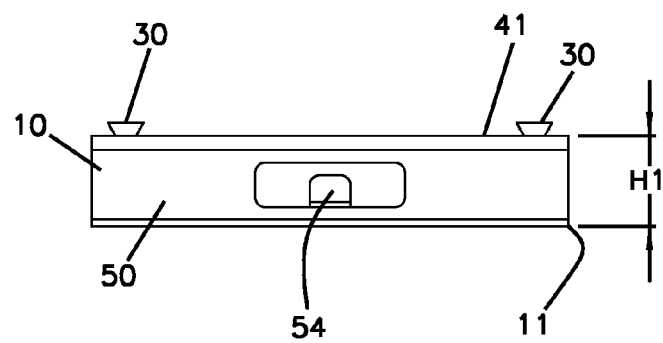
FIG. 8 is a side view of the support frame shown in FIG. 1.
Figure 9:
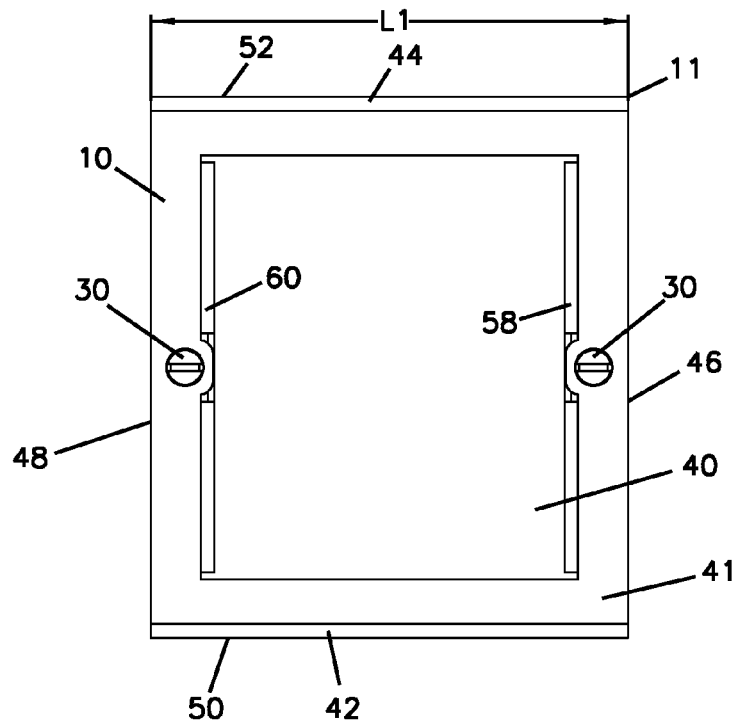
FIG. 9 is a top view of the support frame shown in FIG. 1.

To add rigidity to the extension legs 50, 52, and to provide a rounded surface for easier insertion into the receiving grooves 28, 29, each extension leg 50, 52 may be provided with an upturned portion 50a, 52a that adds material thickness to the extension legs 50, 52. Also, and as can be seen at FIG. 4, the upturned portions 50a, 52a extend up to the indented portion 28a, 29a of the receiving grooves 28, 29 (i.e. in a direction towards mounting surface 41). This configuration provides for a snap-fit type connection in which the receiving groove indented portion 28a, 29a initially expands away from the extension leg 50, 52 as the extension leg 50, 52 is being inserted, and then snaps back towards its original position once the upturned portion 50a, 52a has extended past the indented portion 28a, 29a.

To further secure the support frame 10 to the channel 12, the first extension leg 50 may be provided with a first tab 54 that extends away from first extension leg 50 and towards the mounting surface 41. Likewise, the second extension leg 52 may be provided with a second tab 56 that extends away from second extension leg 52 and towards the mounting surface 41. In one aspect, the tabs 54, 56 are provided at an angle A1 with respect to the respective extension legs 50, 52 such that the tabs 54, 56 provide a lateral force against the receiving grooves 28, 29. In the example embodiment shown, angle A1 is about 157 degrees although other angles are possible without departing from the concepts provided herein.

The support frame 10 may also be provided with a first extension member 58 and a second extension member 60. The extension members 60 are provided to add rigidity to the support frame 10 resulting in an improved mounting platform for the faceplate 14 as the faceplate 14 is attached to the support frame 10 with fasteners 30 near the extension members 58, 60. As shown, the first extension member 58 extends away from the mounting surface 41 at aperture 40 near the third side edge 46 while the second extension member 60 extends away from mounting surface 41 at aperture 40 near the fourth side edge 48.

With reference to FIG. 2, it can be seen that the support frame 10 allows an installer to cut the channel covers 20, 22 to length such that the covers 20, 22 may be installed adjacent to the respective side edges 46, 48 of the support frame 10. This configuration removes the necessity to cut openings in the covers 20, 22 in order to provide access into the interior volume 15 of the channel 12. Rather, the installer simply needs to install covers of an appropriate length alongside the desired number of support frames 10.

Figure 10:
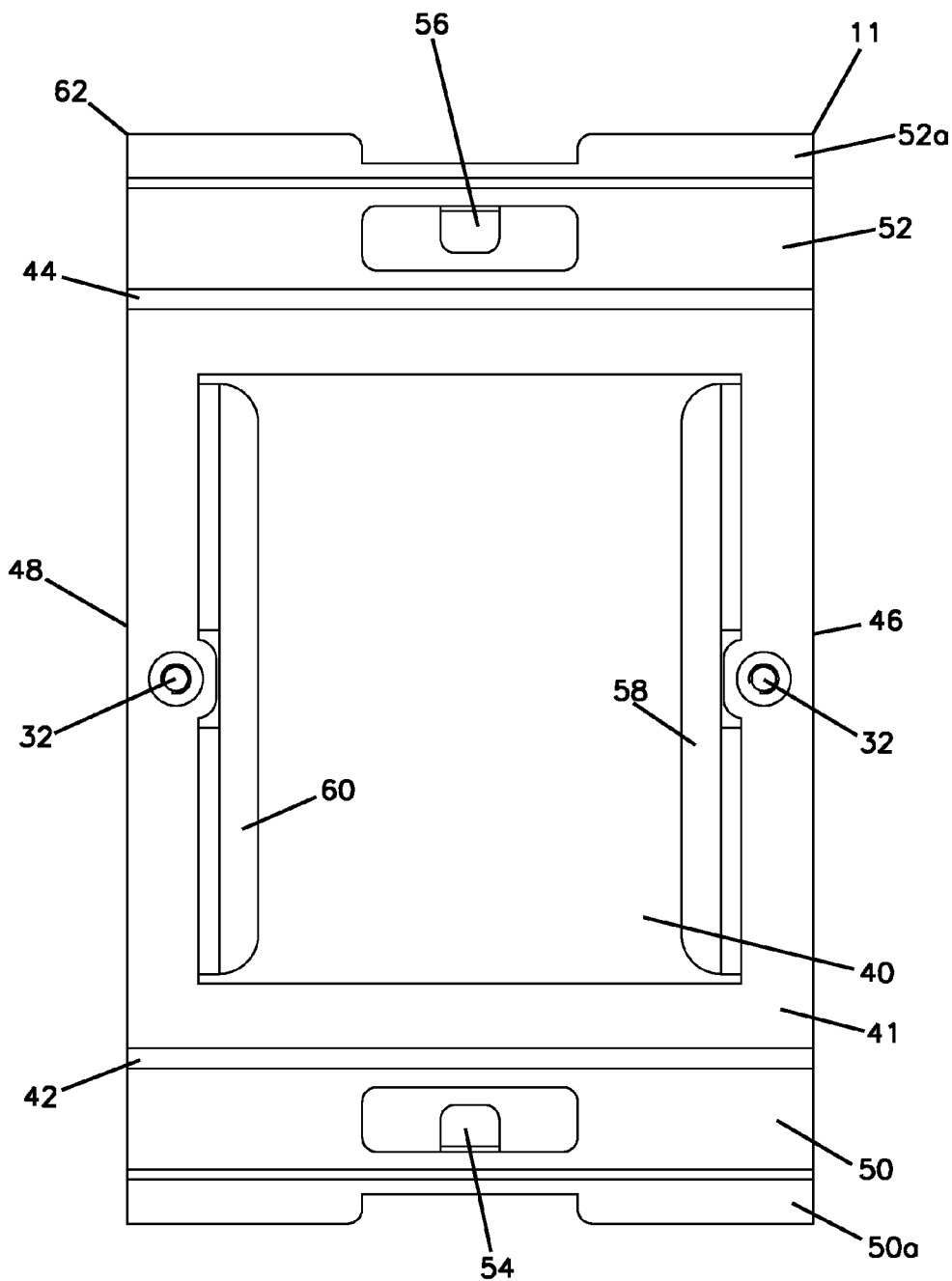
FIG. 10 is a top view of a sheet of material usable for forming the support frame shown in FIG. 1.

With reference to FIG. 10, the support frame 10 can be formed from a single, intially flat sheet of material 62 having a generally constant thickness. In one example, the material sheet 62 is a metal material such as carbon steel and the sheet has a thickness of about 1 millimeter (mm). As configured, the finally formed support frame 10 has a width W1, a length L1, and a height H1. In the example embodiment shown, the width W1 is about 79.5 mm, length L1 is about 70 mm, and height H1 is about 13.3 mm. However, many other dimensions are possible to accommodate different channel body 12 sizes and/or various types and sizes of connector body 16 styles.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

PARTS LIST 1 cabling trunk assembly
5 support frame system
10 support frame
11 support frame main body
12 channel body 12a channel body first side face
12b channel body second side face
13 channel open face
14 face plate
15 channel interior volume
16 connector housing or body
18 connector housing jacks
20 cover
22 cover
24 extension leg
25 extension leg
26 tabs
28 receiving groove
28a receiving groove indented portion
29 receiving groove
29a receiving groove indented portion
30 fastener
32 threaded opening
34 fastener
36 threaded opening
38 face plate central aperture
40 support frame central aperture
41 mounting surface
42 first side edge
44 second side edge
46 third side edge
48 fourth side edge
50 first extension leg
50a upturned portion
52 second extension leg
52a upturned portion
54 first tab
56 second tab
58 first extension member
60 second extension member
62 sheet material

What is claimed is:

1. A support frame for installation in a cabling trunk body, the support frame comprising:
(a) a formed metal main body having a mounting surface extending between opposite first and second side edges and extending between opposite third and fourth side edges, the main body including a central aperture;
(b) a first extension leg extending along the main body first side edge and away from the mounting surface to a first end, the first extension leg being configured for insertion into a first receiving groove of the cabling trunk body, the first extension leg including an upturned portion at the first end;
(c) a second extension leg parallel to the first extension leg and extending along the main body second side edge and away from the mounting surface to a second end, the second extension leg being configured for insertion into a second receiving groove of the cabling trunk body, the second extension leg including an upturned portion at the second end;
(d) a first tab formed as part of the first extension leg and extending at an angle away from a part of the first extension leg, the first tab being configured to retain the first extension leg within the first receiving groove; and
(e) a second tab formed as part of the second extension leg and extending at an angle away from a part of the second extension leg, the second tab being and configured to retain the second extension leg within the second receiving groove.

2. The support frame of claim 1, further comprising at least one threaded opening in the mounting surface for securing a face plate to the support frame.

3. The support frame of claim 2, wherein the support frame has two threaded openings in the mounting surface for securing the face plate to the support frame.

4. The support frame of claim 1, wherein the main body, first extension leg, and second extension leg are integrally formed from the same sheet of material.

5. The support frame of claim 1, wherein the main body, first extension leg, the second extension leg, the first tab, and the second tab are integrally formed from the same sheet of material.

6. The support frame of claim 1, wherein the support frame is made from a metal material.

7. The support frame of claim 1, wherein the first extension leg is configured for a snap-fit connection with the first receiving groove and the second extension leg is configured to provide a snap-fit connection with the second receiving groove.

* * * * *